United States Patent
Liao

(10) Patent No.: US 8,491,975 B2
(45) Date of Patent: Jul. 23, 2013

(54) GLOSSY MEDIUM FOR INKJET PRINTING

(75) Inventor: Jessica Liao, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/259,333

(22) PCT Filed: Oct. 23, 2009

(86) PCT No.: PCT/US2009/061926
§ 371 (c)(1), (2), (4) Date: Sep. 23, 2011

(87) PCT Pub. No.: WO2011/049583
PCT Pub. Date: Apr. 28, 2011

(65) Prior Publication Data
US 2012/0021147 A1    Jan. 26, 2012

(51) Int. Cl.
*B41M 5/00* (2006.01)
*B41M 5/52* (2006.01)
*B41M 5/50* (2006.01)
*C04B 41/00* (2006.01)

(52) U.S. Cl.
CPC ............... *B41M 5/5218* (2013.01); *B41M 5/52* (2013.01); *B41M 5/506* (2013.01); *B41M 5/5254* (2013.01); *C04B 41/009* (2013.01)
USPC .................. 428/32.21; 428/32.24; 428/32.31; 428/32.33; 428/32.34; 428/32.38; 427/243

(58) Field of Classification Search
CPC ........ B41M 5/5218; B41M 5/52; B41M 5/506; B41M 5/5254; C04B 41/009
USPC .......... 428/32.21, 32.24, 32.31, 32.33, 32.34, 428/32.38; 427/243
See application file for complete search history.

(56) References Cited

U.S. PATENT DOCUMENTS 6,565,949 B1 * 5/2003 Wang et al. ................. 428/32.24
2002/0150736 A1 * 10/2002 Quintens et al. ............. 428/195

FOREIGN PATENT DOCUMENTS

EP    1059173 A2 * 12/2000

* cited by examiner

*Primary Examiner* — Betelhem Shewareged

(57) ABSTRACT

An inkjet print medium with a glossy ink-receiving surface, which includes a substrate, an undercoat layer containing acrylic-polyurethane hybrid polymer and polyoxazoline; and at least one ink-receiving layer containing inorganic pigment particles and a binder, wherein the undercoat is formed between the substrate and the at least one ink-receiving layer.

20 Claims, 1 Drawing Sheet

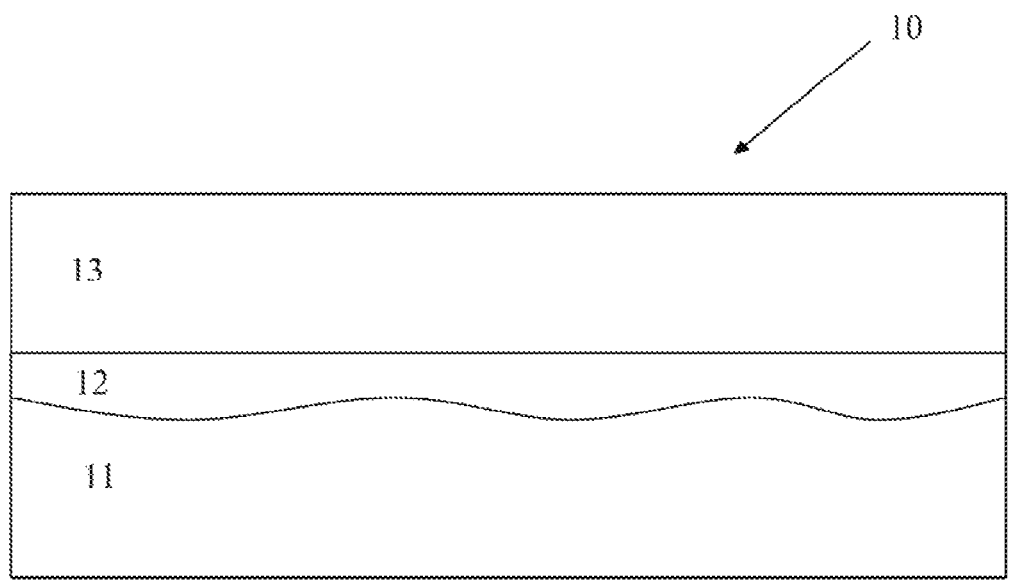

GLOSSY MEDIUM FOR INKJET PRINTING

BACKGROUND

The present disclosure relates generally to print media suitable for inkjet printing, more particularly, to coated print media with glossy finish.

To enhance the quality of printed image, print media are often coated with one or more coatings to promote ink transfer and/or enhance image quality. Differences in various print media characteristics are due to the differences in the type of coating used. For photographic and other high-resolution imaging, it is desirable to have print media or papers that could yield printed images with color reproduction, image quality and gloss as close as possible to the properties of silver halide photography by inkjet printing.

BRIEF DESCRIPTION OF THE DRAWINGS

FIG. 1 is a schematic cross-sectional view of a coated medium according to an embodiment of the present disclosure.

DETAILED DESCRIPTION

For inkjet printing, aqueous inks, which contain a high amount of water and other solvents, are typically used. Conventional print media (e.g. papers) used in inkjet printing typically have a porous image-receiving layer (i.e., the layer onto which ink droplets are deposited), which contains inorganic and/or organic pigments and a binder. The inorganic and/or organic particles in the porous layer form pores by the interstitial spacing between the particles and the binder is used to hold the particles together. This porous image-receiving layer is designed to absorb the liquid component in the ink quickly to reduce drying time. Inkjet printing can be used to print digital images with photographic quality if glossy inkjet papers are used, but the challenge is to produce coated papers with high "mirror image" gloss or distinctness-of-image (DOI) gloss in addition to fast drying capability.

As used herein, the term "gloss" refers generally to the amount of light reflected by an object's surface, such as an ink-jet media surface. Gloss can be quantified, as is common in the art, and is measured relative to specific specular angles from an object surface. The specular angle is the angle equal to but opposite the angle of incidence. This specular light is responsible for the highlights visible on shiny materials. When quantifying specular gloss, it can be measured at angles of 20°, 45°, 60°, and 85° off of the normal. DOI gloss is related to specular gloss and is a measure of the sharpness of reflection, whether the reflection is specular or diffuse. Measurements of DOI gloss can be made by using a sample being evaluated as a mirror. In one method, the "reflection of a grid on the surface of the panel is compared visually to a set of photographic standards ranging from a nearly perfect mirror reflection to a blurred image in which the grid cannot be detected" (see *Organic Coatings: Science and Technology* by Wicks, Jr., Jones, Pappas, Wicks, p. 414 (2007, 3$^{rd}$ edition), Distinctness of image is strongly affected by the surface smoothness or texture of the substrate. Larger amount of surface irregularities (e.g. orange peel, ripples, scratches etc.) lead to distortion of the reflected image.

To increase the glossiness of inkjet media, prior solutions include utilizing a special coating process such as cast-coating, which involves drying the wet coated medium against a smooth mirrored-surface drum. Such coating process is limited in manufacturing capacity and requires specialized coating equipment. Another solution is to form a fusible layer over the ink-receiving layer and subsequently heating the fusible layer after printing so that it is fused onto the surface of printed image. Such fusible layer requires a special heating device to be added to the printing apparatus. Yet another conventional solution is a post-printing solution, which requires the application of an overcoat by liquid coating or film lamination after the medium has been printed. However, such approaches require additional equipments and processing steps, and hence, increase the cost of manufacturing and printing.

The present disclosure provides a coated, inkjet medium with improved unimaged gloss levels, including DOI gloss, by providing an undercoat between the ink-receiving layer and the supporting substrate. Referring to FIG. 1, the improved inkjet medium 10 includes a substrate 11, a porous ink-receiving layer 13 and an undercoat 12 between the ink-receiving layer 13 and the substrate 11. The ink-receiving layer 13 may be a single layer, but it may be substituted with a composite of multiple ink-receiving layers that have been sequentially formed. When there are multiple ink-receiving layers, the undercoat 12 is directly under the first ink-receiving layer, i.e., the ink-receiving layer that is formed first on the substrate. The improved inkjet medium can be manufactured using the existing coating processes and does not require post-printing coating or fusing.

As used herein, the terms "over," "above," and "below" refer to the order of the layers over the substrate 11, which is the bottom-most layer. The term "ink-receiving layer" refers to the layer that is intended for receiving the ink during inkjet printing to form an image thereon. It is intended to be absorptive of the liquid component (e.g. water) in the aqueous ink. The term "porous" refers to the porosity based on micro-pores formed by interstitial spacing between the particles in the ink-receiving layer. The ink absorption capacity of the ink-receiving layer is based on liquid absorption into the micro-pores by capillary action.

According to a preferred embodiment, the ink-receiving layer 13 contains inorganic pigment particles and at least one water-soluble or hydrophilic binder. The amount of inorganic pigment particles relative to binder may range from 10:1 to 4:1.

Suitable inorganic pigment materials include precipitated calcium carbonate, ground calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, fumed silica, pseudo-boehmite, aluminum hydroxide, alumina, modified alumina, lithopone, zeolite, hydrated halloysite, magnesium carbonate, and magnesium hydroxide. Furthermore, the inorganic pigments may be non-porous or porous.

In addition to inorganic pigments, the ink-receiving layer 13 may optionally include a minor amount of organic pigment particles such as polystyrene, polymethyl methacrylate, polytetrafluoroethylene, polyethylene; urea resin, melamine resin, other latexes, and mixtures thereof. If organic particles are added, the total amount of organic particles may be within the range of about 0.1 wt. % to 20 wt. % based on the total dry weight of the ink-receiving layer. As used herein, "wt. %" means the number of parts by weight of a component per 100 parts by weight of all components in the layer.

Suitable water-soluble binders include natural polymers or modified products thereof such as albumin; gelatin; casein; starch; gum arabicum; sodium or potassium alginate; hydroxyethylcellulose; carboxymethylcellulose; α-, β-, or γ-cyclodextrine; and the like. In the case where one of the water-soluble polymers is gelatin, all known types of gelatin may be used, such as, for example, acid pigskin or limed bone gelatin, acid- or base-hydrolyzed gelatin, as well as derivatized gelatins such as phthalaoylated, acetylated, or carbamoylated gelatin or gelatin derivatized with the anhydride of trimellytic acid. Hydrophilic synthetic polymers may also be used as binders and include, but are not limited to, polyvinyl alcohol; completely or partially saponified products of copolymers of vinyl acetate and other monomers; homopolymers of or copolymers with monomers of unsaturated carboxylic acids such as (meth)acrylic acid, maleic acid, crotonic acid, and the like; and homopolymers of or copolymers with vinyl monomers of sulfonated vinyl monomers such as vinylsulfonic acid, styrene sulfonic acid, and the like. Additional synthetic polymers include homopolymers of or copolymers with vinyl monomers of (meth)acrylamide; homopolymers or copolymers of other monomers with ethylene oxide; polyurethanes; polyacrylamides; water-soluble nylon-type polymers; polyvinyl pyrrolidone; polyesters; polyvinyl lactams; acrylamide polymers; substituted polyvinyl alcohol; polyvinyl acetals; polymers of alkyl and sulfoalkyl acrylates and methacrylates; hydrolyzed polyvinyl acetates; polyamides; polyvinyl pyridines; polyacrylic acid; copolymers with maleic anhydride; polyalkylene oxides; methacrylamide copolymers; and maleic acid copolymers. Mixtures of the above polymers may also be used as binders in the ink-receiving layer.

The ink-receiving layer 13 may also include other coating additives such as a crosslinking agent for the binder (e.g. boric acid and salts thereof), surfactants, humectants, rheology modifiers, defoamers, optical brighteners, biocides, pH controlling agents, dyes, and other additives for further enhancing the properties of the coating. The total amount of optional coating additives may be in the range of 0.1 wt. % to 10 wt. % based on based on the total dry weight of the ink-receiving layer.

In contrast to the ink-receiving layer 13, the undercoat 12 is designed so as not to have high absorptivity of the liquid component in the aqueous ink, particularly water. As used herein, "not having high absorptivity" refers to being capable of maintaining substantially the same coat weight (i.e., <1% change in coat weight) and coating integrity after being wet completely by water through spraying, and then blotted with a tissue to remove excess water. This undercoat 12 functions to increase the glossiness of the coated medium as well as enhance the adhesion between the ink-receiving layer 13 and substrate 11. The undercoat 12 is composed of a special blend of two film-forming polymers: acrylic-polyurethane hybrid polymer and polyoxazoline. The weight ratio of acrylic-polyurethane hybrid polymer to polyoxazoline may range from 95:5 to 70:30, more preferably 75:25. These polymers have excellent film forming property and are capable of providing smoothness to the substrate 11. The undercoat 12 is substantially void of the inorganic pigments described above in reference to the ink-receiving layer 13 or other absorbent pigments, i.e., it is made without intentionally adding inorganic pigment particles or other absorbent particles.

As used herein, "acrylic-polyurethane hybrid polymer" refers to a copolymer comprising of acrylic and urethane groups. Its "hybrid" nature is analogous to an interpenetrating network of closely associated acrylic and polyurethane polymers. This hybrid nature is structurally different from a mixture of acrylic polymer particles and polyurethane polymer particles formed by physically mixing the two polymers. Acrylic-polyurethane hybrid polymer is usually commercially available as a latex dispersion. There are generally two methods for preparing such hybrid polymers. In the first method, the polyurethane is first prepared, then acrylic monomers are added, and subsequently, the acrylic polymer is formed in the presence of the polyurethane. In the second method, a polyurethane prepolymer is formed, the acrylic monomers are added to the prepolymer, the mixture is dispersed in water, and then the polyurethane and acrylic polymerizations are carried out concurrently. Examples of suitable acrylic-polyurethane hybrid polymer dispersions to be used in the special polymer blend include Hybridur® 540, Hybridur® 560 and Hybridur® 570 available from Air Products and Chemicals, Inc.

Specific polyoxazoline includes poly(2-ethyl-2-oxazoline) or poly(2-methyl-2-oxazoline). It has been discovered that not all forms of polyoxazoline provide the results desired. When combined with acrylic-polyurethane hybrid polymer, polyoxazoline with molecular weight of 200,000 g/mol or greater yields high quality coatings. By contrast, using polyoxazoline with lower molecular weight results in coatings with defects, such as uneven coverage, cracking, wrinkling, or flaking. Accordingly, it is preferred that the polyoxazoline to be used in the special polymer blend has a molecular weight of 200,000 g/mol or greater, more preferably 200,000-500,000 g/mol. Examples of suitable polyoxazoline are Aquazol 200 (poly(2-ethyl-2-oxazoline) with molecular weight of about 200,000 g/mol) and Aquazol 500 (poly(2-ethyl-2-oxazoline) with molecular weight of about 500,000 g/mol) both available from Polymer Chemistry Innovations, Inc.

The supporting substrate 11 may be an uncoated raw paper or a pre-coated paper. The raw paper may be manufactured from cellulose fibers. More specifically, the raw paper may be produced from chemical pulp, mechanical pulp, thermal mechanical pulp and/or the combination of chemical and mechanical pulp. The raw paper may also include conventional additives such as internal sizing agents and fillers. The sizing agents are added to the pulp before it is converted into a paper web or substrate. They may be chosen from conventional internal sizing agents for printing papers. The fillers may be any particular types used in conventional paper making. As non-limiting examples, the fillers may be selected from calcium carbonate, talc, clay, kaolin, titanium dioxide and combinations thereof. Examples of pre-coated paper include, but are not limited to, inorganic pigment-coated papers and resin-coated papers. The resin coatings on resin-coated papers may be formed from polyethylene, polypropylene, polyethylene terephthalate, or other extrudable polymers. Such resin-coated papers are widely used for photographic printing. A common problem associated with using such resin-coated papers as the supporting substrate is the bad adhesion between the ink-receiving layer and the substrate. One of several advantages of the presently disclosed undercoat is that the undercoat provides good adhesion between the resin-coated substrate and the ink-receiving layer. Unlike other conventional adhesion-promoting "subbing" layers, the novel undercoat of the present disclosure functions to increase DOI gloss. The combination of resin-coated paper substrate, the undercoat layer, and the inkjet-receiving layer as disclosed herein produces an inkjet paper that has a very smooth texture and superior DOI gloss—attributes that are desirable for high quality photo-grade paper.

Other applicable substrates include cloth, nonwoven fabric, felt, synthetic (non-cellulosic) papers, plastic sheets, transparent sheets, and metal sheets.

The ink-receiving layer 13 and the undercoat 12 may be formed onto the substrate 11 by any conventional coating technique such as rod coating, gravure coating, blade coating, slide hopper coating, slot coating or curtain coating. To form the undercoat 12, water and/or other co-solvents may be mixed with the polymer blend of the undercoat as needed to provide the properties (e.g. viscosity) required for coating application. The ink-receiving layer 13 is formed by applying a slurry containing the components discussed above. In a preferred embodiment, an aqueous formulation containing the polymer blend of the undercoat 12 is applied onto the substrate 11 first and then completely dried. Subsequently, the coating formulation of the ink-receiving layers 13 is applied over the undercoat 12 and then dried. If multiple ink-receiving layers are applied, the layers may be applied simultaneously wet-on-wet in a single step. Drying can be accomplished by any conventional drying means such as forced-air drying oven, infrared (IR) dryers, and the like. A calendaring process may be performed after the ink-receiving layer 13 has been dried to further improve surface smoothness and gloss. The calendaring process may include super calendar or soft calendar.

The coat weight of the undercoat 12 may be in the range of 0.1 gsm to 20 gsm, depending on the thickness and basis weight of the supporting substrate 11 and the desired DOI gloss. As used herein, "gsm" represents grams per squaremeter. If a resin-coated substrate with a surface smoothness of greater than or equal to 0.5 $R_a$ slope angle (a measure of surface roughness) as measured by white light interferometry, is utilized, a preferred undercoat coat weight is from 1 gsm to 7 gsm to produce the desired DOI benefit as described in this disclosure. The coat weight of the ink receiving layer 13 is dependent upon its composition and the final application requirements (e.g. whether a single layer or a multilayered structure is required). In certain embodiments, the coat weight of the ink receiving layer 13 is in the range of 15 gsm to 30 gsm.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 0.01 to 2.0" should be interpreted to include not only the explicitly recited values of about 0.01 to about 2.0, but also include individual values and sub-ranges within the indicated range. Thus, included in this numerical range are individual values such as 0.02, 0.03, 0.04 etc.

The following Examples will serve to illustrate representative embodiments and should not be construed as limiting of the disclosure in any way. All percentages referred to herein are dry weight percentages unless otherwise indicated.

EXAMPLES

Example 1

Undercoat formulations A-G formed from acrylic-polyurethane hybrid polymer and/or polyoxazoline were prepared according to the formulations shown in Table 1. All formulations were prepared in water to form aqueous formulations with a solid concentration of 25%.

TABLE 1

| Chemicals | Dry weight % in formulation | | | | | | |
|---|---|---|---|---|---|---|---|
| | A | B | C | D | E | F | G |
| Acrylic-polyurethane hybrid dispersion, waterborne (Hybridur 540[1]) | 100 | | 75 | 75 | 75 | 50 | 25 |
| Polyoxazoline of MW~50K g/mol (Aquazol 50[2]) | | | 25 | | | | |
| Polyoxazoline of MW~200K g/mol (Aquazol 200[3]) | | 100 | | 25 | | 50 | 75 |
| Polyoxazoline of MW~500K g/mol (Aquazol 500[4]) | | | | | 25 | | |

[1]supplied by Air Products and Chemicals, Inc.
[2,3,4]supplied by Polymer Chemistry Innovations, Inc.

Formulation H for forming an ink-receiving layer was prepared according to the following formulation, in dry weight percentages:
81.6 wt % fumed silica
14.6 wt % polyvinyl alcohol
1.8 wt % boric acid (as crosslinker)
1.2 wt % glycerol (humectant)
0.6 wt % silicone surfactant The above components were mixed with deionized water to form a slurry with a solid concentration of 22%. Each of Formulations A-G was applied onto a polyethylene-coated paper and subsequently dried using a forced-air heat gun for several minutes to form an undercoat with coat weight of 5 gsm. The polyethylene-coated paper was made by coating a plain paper with polyethylene (PE) using a Gardco 10-inch blade applicator to form a PE coating with 5 gsm coat weight. Formulation H was subsequently applied at 22 gsm coat weight with a Meier Rod on top of each of the undercoats formed from Formulations A-G and dried in the same manner as in the case of the undercoats. The coating quality of the coated papers was observed and the results are summarized in Table 2. The coating quality is defined as "Good" when the coating is substantially free of defects, and "Poor" when there are defects including uneven coverage, cracking, poor adhesion, flaking, wrinkling, and matting.

TABLE 2

| Undercoat | Coating quality of undercoat | Coating quality of undercoat and layer H |
|---|---|---|
| A | Good | Poor |
| B | Good | Poor |
| C | Poor | Poor |
| D | Good | Good |
| E | Good | Good |
| F | Good | Poor |
| G | Good | Poor |

As indicated in Table 2, undercoat formulations D and E, which are representative of the inventive undercoat composition of the present disclosure, resulted in good coating quality when the ink-receiving layer H was formed thereon. However, for coated samples in which the undercoat is formed of acrylic-polyurethane hybrid polymer alone (Formulation A) or polyoxazoline alone (Formulation B), poor coating quality was observed when the ink-receiving layer H was formed thereon. The results in Table 2 also indicate that the molecular weight of polyoxazoline and the weight ratio of acrylic-polyurethane to polyoxazoline also affect the coating quality of the undercoat and/or ink-receiving layer.

Example 2

For comparison, undercoat compositions L, N, O, S, V, Y were prepared according to formulations shown in Table 3.

TABLE 3

| Chemicals | Dry weight % in formulation | | | | | |
|---|---|---|---|---|---|---|
| | L | N | O | S | V | Y |
| Acrylic-polyurethane hybrid dispersion, waterborne (Hybridur 540) | | | | 80 | 25 | |
| Polyoxazoline of molecular weight ~200K g/mol (Aquazol 200) | | 50 | 25 | | | |
| Polyurethane dispersion, waterborne, physically drying/self-crosslinking emulsion (Daotan[1]) | 100 | | | | | |
| Acrylic resin, waterborne, physically drying/self-crosslinking (Viacryl[2]) | | | | 20 | | |
| Styrene-acrylic emulsion, waterborne (Lucidene 614[3]) | | 50 | 75 | | | |
| Acrylic alkyd resin, waterborne (Resydrol AY 6150[4]) | | | | | 75 | |
| Polyvinyl alcohol with viscosity of ~40 cP, 88% hydrolysis (Mowiol 40-88[5]) | | | | | | 100 |

[1]available from Cytec Industries Inc.
[2]available from Cytec Industries Inc.
[3]available from Rohm & Haas Co.
[4]available from Cytec Industries Inc.
[5]available from Kuraray America, Inc.

Each of undercoat Formulations L, N, O, S, V, Y was applied at 5 gsm coatweight onto a base paper coated with 25 gsm of polyethylene (PE). The coating was dried using a forced-air heat gun for several minutes. Formulation H, prepared as in Example 1, was subsequently applied at 22 gsm coat weight with a Meier Rod on top of the undercoat, and dried in the same manner done for the undercoat. The coated samples were assessed for coating quality as discussed in Example 1 and the results are summarized in Table 4.

TABLE 4

| Undercoat | Coating quality of undercoat | Coating quality of undercoat and layer H |
|---|---|---|
| L | Good | Poor |
| N | Poor | Poor |
| O | Poor | Poor |
| S | Good | Poor |
| V | Poor | Poor |
| Y | Good | Poor |

As indicated in Table 4, not all latex and binder materials worked well as undercoat, and that blending acrylic-polyurethane hybrid polymer or polyoxazoline with a different latex did not produce good coating quality for the ink-receiving layer H as provided by using the blend of acrylic-polyurethane hybrid polymer and polyoxazoline (Formulation D and E).

Example 3

Undercoat Formulation D with 25% solid concentration was prepared according to the dry weight ratio shown in Table 1. The undercoat formulation D was then applied on a polyethylene-coated paper base, PE-B, having a 20 gsm polyethylene coating on the front-side of the base. Coating was done using a single layer slide die with a web coating speed of 8 feet/min to obtain a final coating D-1 having 6 gsm coat weight. Ink-receiving Formulation H, prepared as in Example 1, was subsequently applied at 22 gsm coat weight with a Meier Rod on top of coating D-1. For comparison, ink-receiving Formulation H was also applied directly onto a polyethylene-coated paper base PE-B, without forming an undercoat there between. Both coated samples were then dried using a forced-air heat gun.

Gloss at 20° and Distinctness-of-image (DOI) gloss were measured for the followings: polyethylene-coated paper base PE-B, D-1 on PE-B, H on D-1/PE-B, and H on PE-B. Gloss at 20°, reported in gloss units on a scale of 1 to 100, was measured using a BYK-Gardner micro-tri-gloss meter, and DOI gloss, measured in units of sharpness on a scale of 0.4 to 16.7 $mm^{-1}$ (wherein higher value represents higher mirror-image gloss), was measured using a Distinctness-of-Image meter from QEA Instruments, Burlington, Mass. As a reference, a silver halide medium such as Fuji Crystal Archive has a DOI measurement of 4.3. DOI gloss is the measurement of the spreading of light to either side of the specular direction, as opposed to specular gloss measurements, which are measured at a given angle (e.g. 20° or 60°), and is the fraction of light reflected in the specular direction. Smoothness of layer H on undercoat D-1, and of layer H on polyethylene-coated paper base PE-B (without undercoat) were also evaluated according to ISO 8791-4:2007 using a Parker-Print-Surf (PPS) instrument. A PPS measurement of lower value represents a smoother surface than a measurement of a higher value. Roughness of coating surface based on $R_a$ slope angle was also evaluated using scanning white-light interferometry. Lower value for $R_a$ represents lower roughness, hence smoother surface. The gloss, smoothness and roughness measurements are shown in Table 5.

TABLE 5

| Sample ID | Gloss at 20° | DOI gloss | Average Smoothness (PPS) | $R_a$ slope angle |
|---|---|---|---|---|
| PE-B | 54 | 2.5 | | 0.5 |
| D-1 on PE-B | 81 | 4.5 | | 0.3 |
| H on D-1/PE-B | 12 | 4.1 | 0.4 | 0.5 |
| H on PE-B | 10 | 2.6 | 1.1 | 0.8 |

As indicated in Table 5, improvements in gloss levels and smoothness are seen when the undercoat D-1 is present between the ink-receiving layer H and the paper base PE-B as compared to the same coated paper without the undercoat D-1. More particularly, the DOI gloss value increased by 158% when the undercoat D-1 is present.

Example 4

Formulations D and H were prepared as described in Example 1. Formulation H2 for forming a second ink-receiving layer was prepared according to the following formulation, in dry weight percentages:
66.8 wt. % alumina
22.3 wt. % colloidal silica
10.2 wt. % polyvinyl alcohol
0.18 wt. % silicone surfactant
0.59 wt. % fluorinated surfactant The above components of Formulation H2 were mixed with deionized water to form a slurry with solid concentration of 26%. Using the same coating procedures described in Example 3, Formulation D was then applied onto a polyethylene-coated paper base, PE-B, followed by drying to form an undercoat D-1 having coat weight of 7 gsm. Formulations H and H2 were subsequently applied onto the undercoat D-1 as a wet-on-wet multilayered coating, with H2 as the lower layer, using a multilayer slide die, and dried with a forced-air drier. The lower layer H2 has a coat weight of 22 gsm and the upper layer H has a coat weight of 0.3 gsm. For comparison, layers H and H2 were again formed on a polyethylene-coated paper base PE-B, but without an undercoat D-1 there between. Gloss at 20° and DOI gloss were measured for the followings: polyethylene-coated paper base PE-B, D-1 on PE-B, H/H2 on D-1/PE-B, and H/H2 on PE-B. The results are shown in Table 6.

TABLE 6

| Sample ID | Gloss at 20° | DOI gloss |
|---|---|---|
| PE-B | 57 | 2.7 |
| D-1 on PE-B | 84 | 4.2 |
| H/H2 on D-1/PE-B | 30 | 4.0 |
| H/H2 on PE-B | 26 | 2.6 |

As indicated in Table 6, improvements in gloss levels are seen when the undercoat D-1 is present between ink-receiving layers H/H2 and the paper base PE-B as compared to the same coated paper without the undercoat D-1.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. An inkjet print medium with a glossy ink-receiving surface comprising:
    a substrate;
    an undercoat comprising acrylic-polyurethane hybrid polymer and polyoxazoline; and
    at least one ink-receiving layer comprising inorganic pigment particles and a binder,
    wherein the undercoat is formed between the substrate and the at least one ink-receiving layer and is adjacent to the at least one ink-receiving layer, and the weight ratio of acrylic-polyurethane hybrid polymer to polyoxazoline is from 95:5 to 70:30, and the undercoat has an absorptivity of water of less than 1% change in coat weight.

2. The inkjet print medium of claim 1, wherein the substrate is a resin-coated paper and the undercoat is formed on the resin-coated surface of the resin-coated paper.

3. The inkjet print medium of claim 1, wherein the undercoat is void of inorganic pigment particles.

4. The inkjet print medium of claim 1, wherein the weight ratio of acrylic-polyurethane hybrid polymer to polyoxazoline is 75:25.

5. The inkjet print medium of claim 1 comprising a plurality of ink-receiving layers and the undercoat is between to the firstly formed ink-receiving layer and the substrate.

6. The inkjet print medium of claim 1, wherein said polyoxazoline has a molecular weight of 200,000 g/mol or greater.

7. The inkjet print medium of claim 6, wherein said polyoxazoline has a molecular weight in the range of 200,000 g/mol to 500,000 g/mol.

8. The inkjet print medium of claim 1, wherein said polyoxazoline is poly(2-ethyl-2-oxazoline).

9. The inkjet print medium of claim 1, wherein said undercoat has a coat weight in the range of 0.1 gsm to 20 gsm, and said ink-receiving layer has a coat weight in the range of 15 gsm to 30 gsm.

10. The inkjet print medium of claim 1, wherein said binder is selected from the group consisting of water-soluble binders and hydrophilic binders, and the weight ratio of inorganic pigment particles to binder in the ink-receiving layer is in the range of 10:1 to 4:1.

11. An inkjet print medium with a glossy ink-receiving surface comprising:
    a substrate;
    at least one ink-receiving layer comprising inorganic pigment particles and a binder; and
    an undercoat between the substrate and the at least one ink-receiving layer, said undercoat comprising acrylic-polyurethane hybrid polymer and polyoxazoline,
    wherein the glossy ink-receiving surface has a distinctness-of-image (DOI) gloss value of about 4.0 to 4.1 based on a scale of 0.4 to 16.7 mm-1 as measured by a distinctness-of-image meter, and
    the undercoat has an absorptivity of water of less than 1% change in coat weight.

12. A method of manufacturing an inkjet print medium with a glossy ink-receiving surface comprising:
    applying an aqueous undercoat formulation comprising acrylic-polyurethane hybrid polymer and polyoxazoline onto a substrate to form an undercoat layer thereon, wherein the weight ratio of acrylic-polyurethane hybrid polymer to polyoxazoline is in the range of 95:5 to 70:3;
    drying the undercoat layer so that the undercoat layer has an absorptivity of water of less than 1% change in coat weight;
    applying a slurry comprising the inorganic pigment particles and a binder onto the undercoat layer to form an ink-receiving layer; and
    drying the ink-receiving layer.

13. The method of claim 12, wherein the weight ratio of acrylic-polyurethane hybrid polymer to polyoxazoline is 75:25.

14. The method of claim 12, wherein the undercoat formulation is void of inorganic pigment particles.

15. The method of claim 12, wherein said polyoxazoline has a molecular weight of 200,000 g/mol or greater.

16. The inkjet print medium of claim 11, wherein said polyoxazoline has a molecular weight of 200,000 g/mol or greater.

17. The inkjet print medium of claim 11, wherein the undercoat facilitates adhesion between the substrate and the at least one ink receiving layer.

18. The inkjet print medium of claim 11, wherein the undercoat comprises a mixture of the acrylic-polyurethane hybrid polymer and the polyoxazoline.

19. The inkjet print medium of claim 18, wherein the mixture comprises a weight ratio of acrylic-polyurethane hybrid polymer to polyoxazoline of from 95:5 to 70:30.

20. The inkjet print medium of claim 18, wherein the mixture comprises a weight ratio of acrylic-polyurethane hybrid polymer to polyoxazoline of 75:25.

* * * * *